(12) United States Patent
Yamazato et al.

(10) Patent No.: US 12,724,415 B2
(45) Date of Patent: Sep. 1, 2026

(54) REMOTE OPERATION METHOD AND REMOTE OPERATION DEVICE

(71) Applicant: TOYOTA JIDOSHA KABUSHIKI KAISHA, Toyota (JP)

(72) Inventors: Narihito Yamazato, Koto-ku Tokyo-to (JP); Koji Taguchi, Sagamihara (JP); Maiko Hirano, Nagoya (JP); Kentaro Ichikawa, Shizuoka-ken (JP); Yoshitaka Adachi, Koto-ku Tokyo-to (JP); Kentaro Takemura, Koto-ku Tokyo-to (JP); Toshiki Horita, Shinagawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 18/122,782

(22) Filed: Mar. 17, 2023

(65) Prior Publication Data

US 2023/0376031 A1 Nov. 23, 2023

(30) Foreign Application Priority Data

May 17, 2022 (JP) ................................ 2022-081129

(51) Int. Cl.
*G05D 1/224* (2024.01)
*G06T 3/4038* (2024.01)

(52) U.S. Cl.
CPC ......... *G05D 1/2248* (2024.01); *G06T 3/4038* (2013.01)

(58) Field of Classification Search
CPC .... G05D 1/2248; G05D 1/2247; G05D 1/243; G05D 2105/22; G05D 2107/13;
(Continued)

(56) References Cited

U.S. PATENT DOCUMENTS

2007/0229719 A1* 10/2007 Huang ................. H04N 9/3141 348/E5.143
2019/0286118 A1* 9/2019 Bando ...................... B62D 1/00
(Continued)

FOREIGN PATENT DOCUMENTS

JP 2019-156299 A 9/2019
JP 2020-077173 A 5/2020
(Continued)

OTHER PUBLICATIONS

Real-Time Systems Design and Analysis, By Phillip A. Laplante ISBN 0-471-22855-9 Â © 2004 Institute of Electrical and Electronics Engineers (Year: 2007).*
(Continued)

*Primary Examiner* — Kito R Robinson
*Assistant Examiner* — Alexander V Gentile
(74) *Attorney, Agent, or Firm* — Dinsmore & Shohl LLP

(57) ABSTRACT

A method to perform remote operation of a mobile vehicle is provided. In this method, data of two types of camera images whose imaging ranges partially overlap each other and data of operation content in the remote operation are acquired. Further, based on the data of the operation content, the position in the vertical direction at which the two types of the camera images are combined is set. Further, at least one of the two types of the camera images is moved in the vertical direction such that the two types of the camera images are combined at the set position in the vertical direction, and the two types of the camera images are combined. Then, a composite image of the two types of the camera images is output from a display of a remote operation device.

12 Claims, 13 Drawing Sheets

(58) Field of Classification Search
CPC ........... G05D 2109/10; G05D 2111/64; G05D 1/0038; G06T 3/4038; H04N 23/66; H04N 23/64; H04N 23/90
See application file for complete search history.

(56) References Cited

U.S. PATENT DOCUMENTS

| | | | | |
|---|---|---|---|---|
| 2019/0286121 | A1* | 9/2019 | Bando | B62D 1/00 |
| 2021/0381197 | A1 | 12/2021 | Otani et al. | |
| 2021/0383517 | A1* | 12/2021 | Shen | H04N 23/90 |
| 2022/0057798 | A1* | 2/2022 | Costin | G05D 1/0242 |
| 2023/0319218 | A1* | 10/2023 | Ren | G06T 3/4038 382/284 |
| 2023/0368484 | A1* | 11/2023 | Munsterteiger | G06V 20/56 |
| 2024/0037711 | A1* | 2/2024 | Hori | G06T 5/50 |
| 2024/0169485 | A1* | 5/2024 | Lee | G06N 3/08 |

FOREIGN PATENT DOCUMENTS

| | | | | |
|---|---|---|---|---|
| JP | 2020-161039 | A | 10/2020 | |
| WO | WO-2014068823 | A1 * | 5/2014 | B60R 1/00 |
| WO | WO-2017042873 | A1 * | 3/2017 | G06T 19/00 |
| WO | WO-2019031873 | A1 * | 2/2019 | G06T 3/4038 |

OTHER PUBLICATIONS

Real-Time Systems Design and Analysis, By Phillip A. Laplante ISBN 0-471-22855-9 © 2004 Institute of Electrical and Electronics Engineers (Year: 2004).*

* cited by examiner

REMOTE OPERATION METHOD AND REMOTE OPERATION DEVICE

CROSS-REFERENCE TO RELATED APPLICATION

The present disclosure claims priority under 35 U.S.C. § 119 to Japanese Patent Application No. 2022-081129, filed on May 17, 2022, the content of which application is incorporated herein by reference in their entirety.

TECHNICAL FIELD

The present disclosure relates to a method and a device for performing remote operation of a mobile vehicle.

BACKGROUND

JP2019-156299A discloses a system in which a composite image viewed from a virtual viewpoint (e.g., above a vehicle) is generated based on a plurality of camera images acquired from a plurality of cameras mounted on a vehicle. The composite image is generated by an information processing device mounted on the vehicle. The information processing device transmits the composite image to a mobile terminal of a user of the vehicle. The mobile terminal outputs the composite image to a display unit of the mobile terminal. The user of the vehicle inputs information for operating the vehicle to the mobile terminal while viewing the composite image output to the display unit. The input information is transmitted from the mobile terminal to the information processing device. The information processing device operates the vehicle based on the input information.

In addition to JP2019-156299A, JP2020-77173A and JP2020-161039A can be exemplified as documents indicating the technical level of the technical field related to the present disclosure.

In the technique disclosed in JP2019-156299A, the user who has got off the vehicle moves the vehicle from a current location to a parking space while operating the mobile terminal near the parking space. Therefore, this conventional technique for outputting the composite image viewed from the virtual viewpoint to the display unit of the mobile terminal is useful from an aspect of safely parking of the vehicle.

A case will be considered where remote operation of a mobile vehicle such as a vehicle is performed. In this case, a plurality of camera images are transmitted from the mobile vehicle to the remote operation device. These camera images are then output on at least one display of the remote operation device. The remote operator views these camera images output to the display and inputs information for the remote operation to the remote operation device.

When attention is paid to two camera images among a plurality of the camera images, there is a case where the same object is captured in these camera images. For example, when the imaging ranges of two cameras partially overlap each other, the same object appears in two types of camera images. The information that the same object exists can be said to be unnecessary information for the remote operator. Therefore, it is desirable that the two types of camera images are processed so as to delete the unnecessary information. For example, if one camera image is combined with the other camera image at the position of the same object, unnecessary information can be reduced.

However, the viewpoints of the plurality of cameras are different from each other. Therefore, when images obtained from the two types of cameras whose imaging ranges partially overlap each other are combined, a distortion or a deviation occurs in a combined portion of the composite image. This problem is expected to be solved by processing the composite image. However, excessive attention to the manipulation of the camera image during the remote operation may interfere with the prompt provision of the camera image to the remote operator.

It is an object of the present disclosure to provide a technique whereby the images obtained from two cameras with partially overlapping imaging ranges can be provided to the remote operator in a form of a quick and useful composite image.

SUMMARY

A first aspect is a method to perform remote operation of a mobile vehicle and has the following features.

The method comprising the steps of:

- acquiring data of two types of camera images whose imaging ranges partially overlap with each other and data of operation content in the remote operation;
- setting a vertical position at which the two types of camera images are combined based on the operation content data;
- compositing the two types of the camera images by moving at least one of the two types of the camera images in the vertical direction such that the two types of the camera images are combined at the set position in the vertical direction; and
- outputting the composite image of the two types of the camera images on a display of a remote operation device.

A second aspect further has the following features in the first aspect.

The method comprising the steps of:

- determining whether an adjustment input of a connecting position of the two types of camera images is received from an input device of the remote operation device while the composite image is output from the display;
- when it is determined that the adjustment input is received, adjusting the connecting position based on the adjustment input; and
- outputting from the display the composite image in which the connecting position is adjusted.

A third aspect further has the following features in the first aspect.

The method comprising the steps of:

- acquiring data of an internal status of the mobile vehicle;
- generating an auxiliary image of the remote operation according to the internal status data;
- adding the auxiliary image to a blank region of the composite image; and
- outputting from the display the composite image to which the auxiliary image is added.

A fourth aspect is a device to perform remote operation of a mobile vehicle and has the following features.

The device includes a memory device, a processor, and a display. The memory device stores various information. The processor is configured to process the various information. An image processed by the processor is output from the display.

The various information includes data of two types of camera images whose imaging ranges partially overlap each other and data of operation content in the remote operation.

The processor is configured to:

setting a position in a vertical direction at which the two types of camera images are combined based on the data of the operation content; and composite the two types of the camera images by moving at least one of the two types of the camera images in the vertical direction such that the two types of the camera images are combined at the set position in the vertical direction; and output from the display the composite image of the two kinds of the camera images.

A fifth aspect further has the following features in the fourth aspect.

The device further includes an input device. The input device is operated by an operator who performs the remote operation.

The processor is further configured to:

determine whether an adjustment input of a connecting position of the two types of the camera images is received from the input device while the composite image is output from the display;

when it is determined that the adjustment input is received, adjust the connecting position based on the adjustment input; and output from the display the composite image in which the connecting position is adjusted.

A sixth aspect further has the following features in the fourth aspect.

The various information further includes data of an internal status of the mobile vehicle.

The processor is further configured to:

generate an auxiliary image of the remote operation based on the data of the internal status;

adding the auxiliary image to a blank region of the composite image; and output from the display the composite image to which the auxiliary image is added.

According to the first or fourth aspect, the composite image of the two types of camera images combined at the position in the vertical direction set based on the data of the operation content is output from the display. Therefore, it is possible to generate the composite image in which a visibility of the image at the connecting position is ensured. Further, it does not take a long time to generate the composite image. Therefore, it is also possible to quickly provide the composite image to the operator.

According to the second or fifth aspect, it is possible to provide the operator with the composite image in which the two types of the camera images are combined at the position where the operator desires to pay attention.

According to the third or sixth aspect, it is possible to effectively utilize the blank region generated by the generation of the composite image.

DESCRIPTION OF EMBODIMENT

Figure 1:
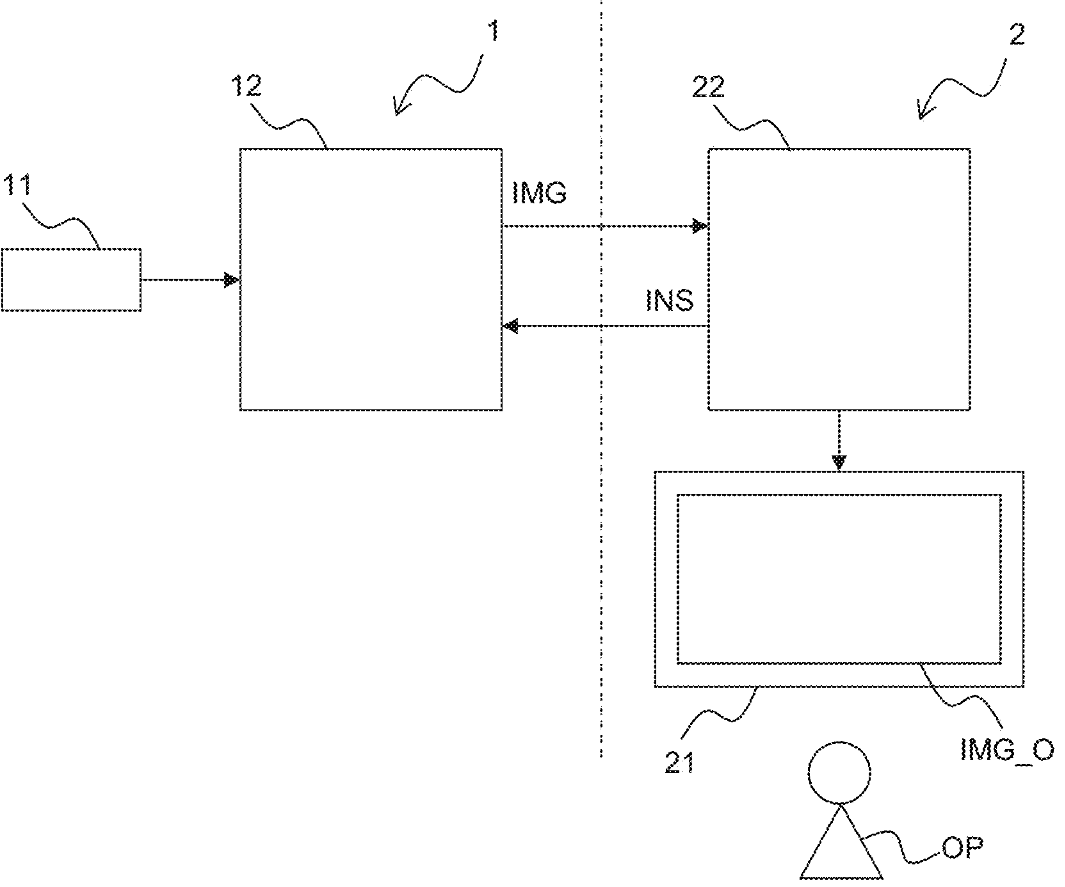
FIG. 1 is a conceptual diagram illustrating a remote operation.

Hereinafter, a remote operation method and a remote operation device according to embodiments of the present disclosure will be described with reference to the drawings. It should be noted that the remote operation method according to the embodiment is implemented by computer processing performed in the remote operation device according to the embodiment. In the drawings, the same or corresponding parts are denoted by the same reference numerals, and the description thereof will be simplified or omitted.

1. Outline of Embodiment

1-1. Remote Operation

FIG. 1 is a conceptual diagram for explaining a remote operation. In FIG. 1, a mobile vehicle 1 and a remote operation device 2 are illustrated. The mobile vehicle 1 and the remote operation device 2 constitute a remote operation system. The mobile vehicle 1 is an example of a target to be subjected to the remote operation by the remote operation device 2. Examples of the mobile vehicle 1 include a vehicle and a robot such as a distribution robot and a work robot.

Examples of the remote operation include a remote operation (remote driving) aimed at an operation directly related to a behavior (e.g., moving forward, stopping, turning, or the like) of the mobile vehicle 1. The remote operation includes a remote command and a remote assistance. The remote command is performed for an operation (e.g., turning on headlights of the mobile vehicle 1) that is not directly related to the behavior of the mobile vehicle 1. The remote assistance is performed for supporting a recognition and a determination by the mobile vehicle 1.

The mobile vehicle 1 and the remote operation device 2 communicate with each other via a base station (not shown) of a network. For example, a data processing device 12 mounted on the mobile vehicle 1 determines whether the remote operation is necessary. When it is determined that the remote operation is necessary, the data processing device 12 transmits a signal requesting the remote operation to the remote operation device 2. At the time of transmitting this signal or prior to transmitting this signal, the data processing device 12 transmits data of a camera image IMG to the remote operation device 2. The data of the camera image IMG is acquired from a camera 11 mounted on the mobile vehicle 1.

A data processing device 22 of the remote operation device 2 transmits various remote command INS to the mobile vehicle 1 in response to the signal requesting the remote operation. Examples of the remote command INS transmitted from the data processing device 22 to the mobile vehicle 1 include a command based on a determination by an operator OP. For example, the operator OP views a camera image for the remote operation (hereinafter, also referred to as an "image for operation") IMG_O output from the display 21 of the remote operation device 2 and understands the content of the request for remote operation. Then, the operator OP determines an action to be taken by the mobile vehicle 1 and inputs an instruction corresponding to the action to the remote operation device 2. Examples of actions to be taken by the mobile vehicle 1 include forward movement, stop, vehicle control for avoiding a contact with an obstacle ahead, and emergency evacuation. The data processing device 22 generates the remote command INS corresponding to the input data from the operator OP and transmits it to the mobile vehicle 1.

1-2. Camera Image for Remote Operation

Figure 2:
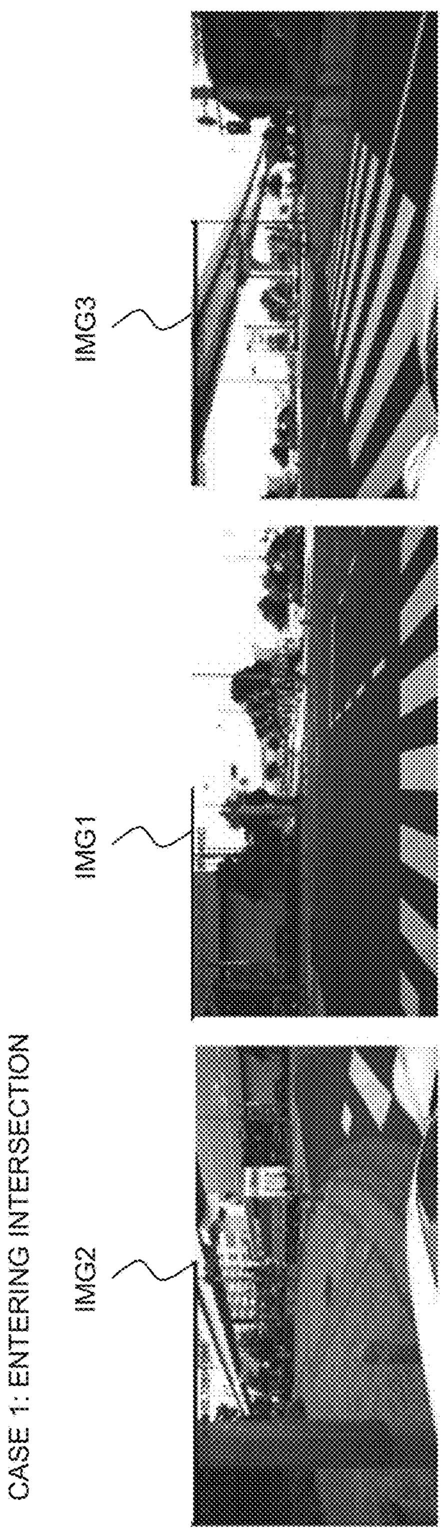
FIG. 2 is a diagram illustrating an example of a camera image.
Figure 2:
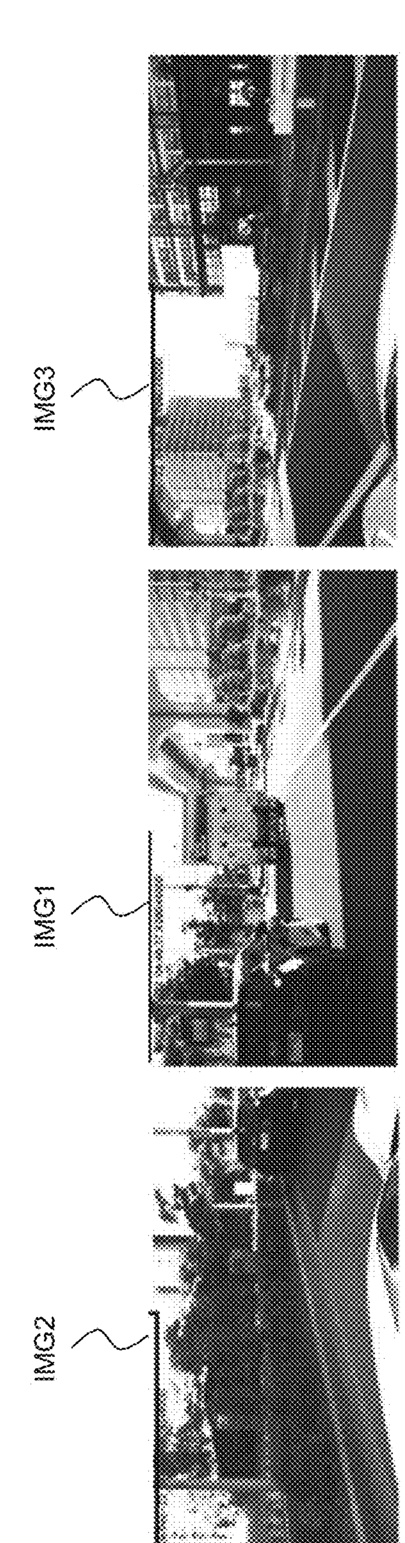

FIG. 2 is a diagram illustrating an example of the camera image IMG. FIG. 2 shows camera images IMG1 to IMG3 acquired by three cameras mounted on a vehicle as an example of the mobile vehicle 1. The camera image IMG1 is acquired by a camera (a front center camera) that captures a space in the front center of the vehicle. The camera image IMG2 is acquired by a camera (a left front camera) that captures a space on the left front side of the vehicle, and the camera image IMG3 is acquired by a camera (a right front camera) that captures a space on the right front side of the vehicle. A portion of the leftward of the imaging range of the front center camera overlaps that of the left front camera. A portion of the rightward of the imaging range of the front center camera overlaps that of the right front camera.

In the upper part of FIG. 2, camera images IMG1 to IMG3 when the vehicle enters an intersection are shown. In the camera image IMG1, a traffic light machine, a pedestrian crossing drawn on a road surface in front of the vehicle, a guidance frame for right turn, and the like are shown. In the camera image IMG2, in addition to the pedestrian crossing drawn on the road surface in front of the vehicle, a pedestrian crossing drawn on the road surface on the left front side of the vehicle, a walker on the pedestrian crossing, and the like are captured. In the camera image IMG3, in addition to a pedestrian crossing drawn on the road surface in front of the vehicle and a guidance frame for a right turn, a lane for a right turn, a lane (an opposite lane) adjacent to this lane, and the like are shown.

In the lower part of FIG. 2, camera images IMG1 to IMG3 when the vehicle performs the vehicle control for avoiding a contact with an obstacle ahead are shown. In the camera image IMG1, a lane in which the vehicle is traveling (hereinafter also referred to as a "traveling lane"), a track traveling on the traveling lane, a vehicle stopped in a breakdown lane of the traveling lane, a lane (an opposite lane) adjacent to the traveling lane, and the like are captured. In the camera image IMG2, the traveling lane, the stopping vehicle, and the like are captured. This stopping vehicle corresponds to an object of the vehicle control for avoiding a contact therewith (i.e., the obstacle). In the camera image IMG3, the traveling lane, the opposite lane, and the like are captured.

The image for operation IMG_O is generated based on the camera images IMG1 to IMG3. For example, when the display 21 includes three displays, three types of the images for operation IMG_O are generated based on the camera images IMG1 to IMG3. These images for operation IMG_O are output from each of the three displays. When the display 21 includes two displays, two types of the images for operation IMG_O are generated based on the camera images IMG1 to IMG3, and these images for operation IMG_O are output from each of the two displays. When the display 21 is only one display, one type of the image for operation IMG_O is generated based on the camera images IMG1 to IMG3, and the image for operation IMG_O is output from the one display.

1-3. Synthesis of Camera Images

In the embodiment, a case where the total number of the displays 21 to which the image for operation IMG_O is output is smaller than that of the cameras 11 that acquire the camera image IMGs is considered. In this case, "m" cameras 11 acquire the camera images IMG1 to IMGm at the same time (m≥2). When the display 21 includes "n" displays (n□m−1), at least two of the camera images IMG1 to IMGm need to be combined (synthesized) to output the images for operation IMG_O generated based on the camera images IMG1 to IMGm from the displays at the same time. For example, to output the camera images IMG1 to IMG3 from one display at the same time, it is necessary to combine these camera images to generate one image for operation IMG_O.

Figure 3:
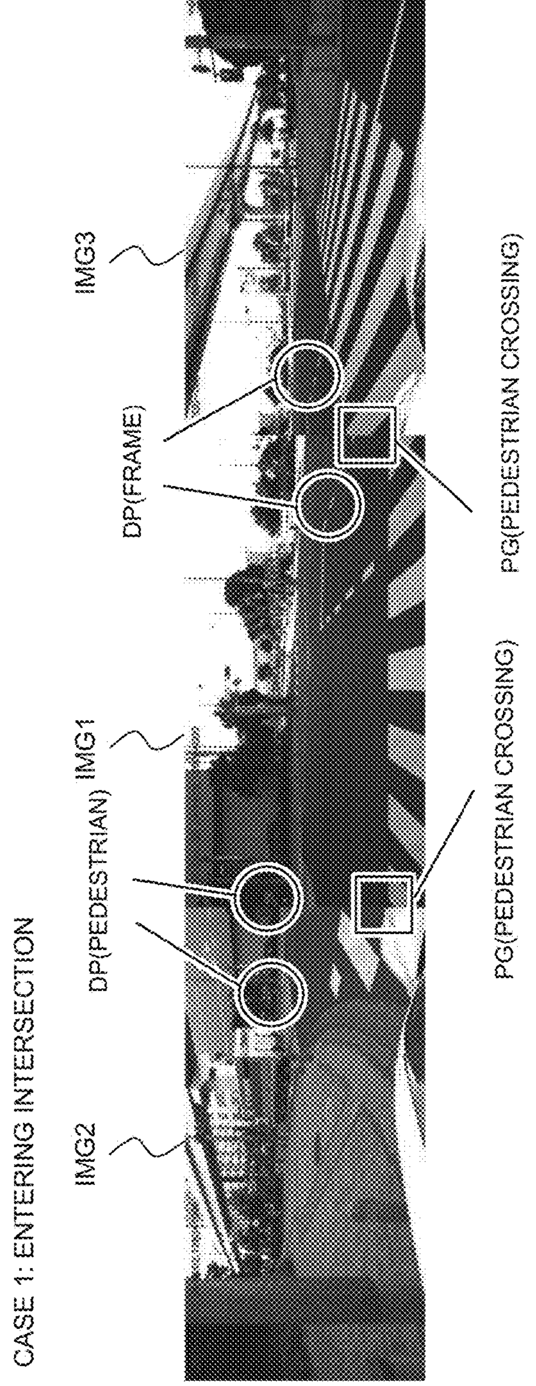
FIG. 3 is a diagram illustrating a synthesis example of the camera image shown in FIG. 2.

FIG. 3 is a diagram illustrating a synthesis example of the camera images IMG1 to IMG3 illustrated in FIG. 2. The upper part of FIG. 3 corresponds to a synthesis example of the camera images IMG1 to IMG3 shown in the upper part of FIG. 2. In the example shown in the upper part of FIG. 3, a right end portion of the camera image IMG1 is simply combined with a left end portion of the camera image IMG2. Therefore, a duplication DP of the same walker is observed at a connecting position of the camera image IMG1 and the camera image IMG2. Further, a position gap PG of the pedestrian crossing is observed at the connecting position.

Further, in this example, the left end portion of the camera image IMG1 is simply aligned with the right end portion of the camera image IMG3. Therefore, the duplication DP of the same frame line is observed at the connecting position of the camera image IMG1 and the camera image IMG3. At this connecting position, a positional gap PG of the pedestrian crossing is also observed.

The lower part of FIG. 3 corresponds to a synthesis example of the camera images IMG1 to IMG3 shown in the lower part of FIG. 2. The method for matching the camera images in the lower part of FIG. 3 is the same as that in the upper part of FIG. 3. Therefore, the duplication DP of the same vehicle is seen at the connecting position of the camera image IMG1 and the camera image IMG2. In addition, the duplication DP of the same white lane (a lane division line) or the duplication DP of the same building may be observed in the connecting position of the camera image IMG1 and the camera image IMG3.

As can be understood from the description of FIG. 3, when the camera images IMG1 to IMG3 are simply arranged and combined, there is no restriction on the total number of displays, but there is a possibility that the information shown in the connecting position confuses the operator OP. Here, if image processing such as changing the connecting positions of the camera images IMG1 to IMG3 is performed, it may be possible to avoid the occurrence of such inconvenience. However, since the viewpoints of the cameras mounted on the vehicle are different from each other, a distortion or a deviation occurs in any part of the image after the image processing (e.g., a portion of the connecting position).

1-4. Synthesis of Camera Image Using Operation Content

According to a recent image processing technique, it is possible to reduce the distortion and the deviation in the image to the utmost limit. However, if the image processing is performed more than necessary, it takes a long time until the processed image (i.e., the image for operation IMG_O) is output to the display 21. As described above, there is a trade-off relationship between outputting the image for operation IMG_O that is easy for the operator OP to view from the display 21 and generating the image for operation IMG_O from the camera image IMG in a short time.

Therefore, in the embodiment, the camera images IMG1 to IMG3 are combined based on the operation content in the remote operation to ensure the visibility and quickly provide the image for operation IMG_O. The data of the operation content is generated in the data processing device 12, for example, before the transmission of the request signal of the remote operation or at the same time as the transmission of the request signal. The data of the operation content is transmitted to the remote operation device 2 simultaneously with the transmission of the request signal or after the transmission of the request signal.

For example, it is assumed that when a vehicle as the mobile vehicle 1 approaches an entrance of an intersection, a request signal of the remote operation for confirming a traffic situation of the intersection is transmitted. In this case, for example, the data processing device 12 executes vehicle control for stopping the vehicle near the entrance of the intersection and transmits the request signal for the remote operation. The transmission of the request signal is performed before or after the vehicle stops. When the request signal is transmitted, the data of the operation content is generated. The data of operation content is expressed by, for example, a binary number indicating the operation content such as "a check the traffic situation at the intersection". The binary number indicating the "check the traffic situation at the intersection" is set in advance.

The data processing device 22 sets a connecting position CP in the vertical direction (a depth direction) of the camera images IMG1 and IMG2 based on the operation content. Alternatively, the data processing device 22 sets the connecting position CP of the camera images IMG1 and IMG3. Alternatively, the data processing device 22 sets the two types of the connecting position CPs described above. The total number of the connecting positions CP corresponds to the total number of the displays 21.

Figure 4:
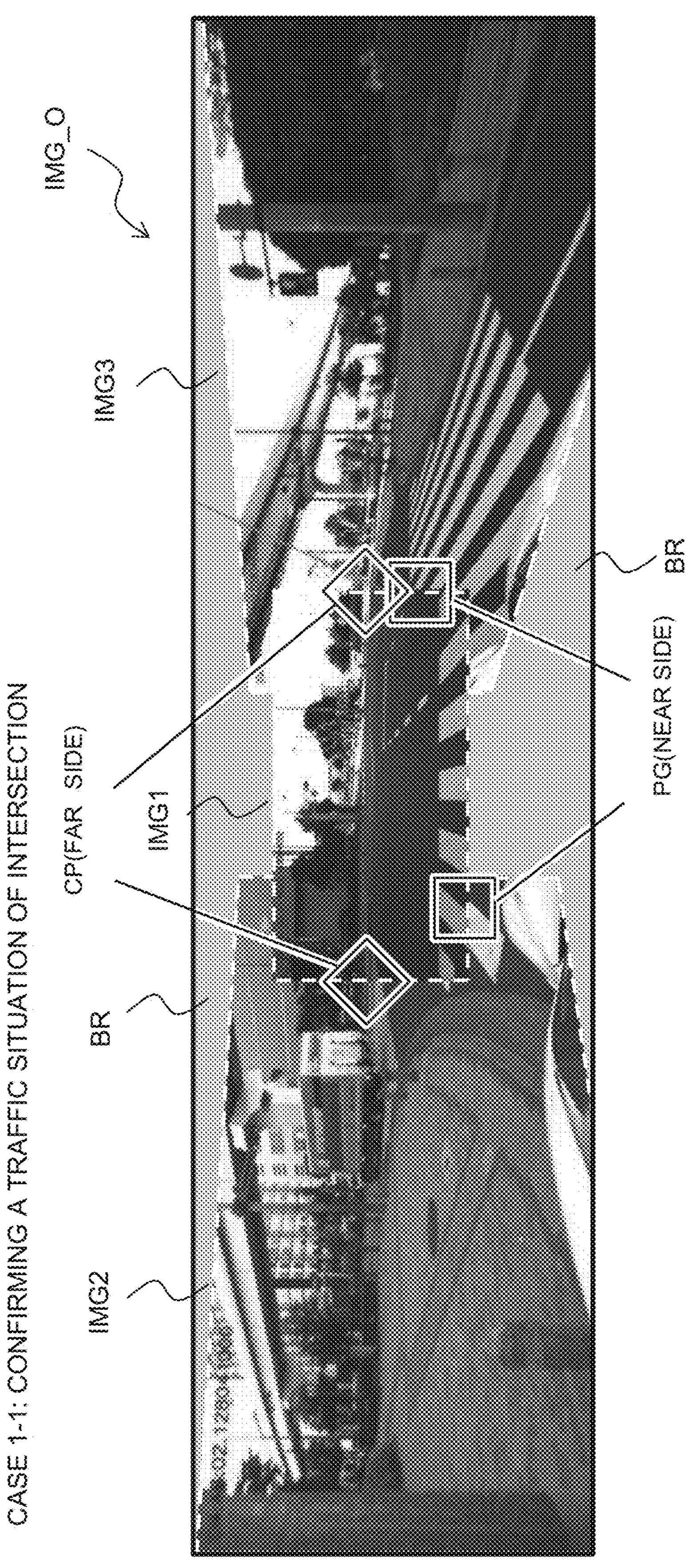
FIG. 4 is a diagram illustrating a synthesis example of the camera image shown in the upper part of FIG. 2.

FIG. 4 shows a synthesis example of the camera images IMG1 to IMG3 shown in the upper part of FIG. 2. In this example, the display 21 is only one display. Then, the camera image IMG1 is combined with the camera image IMG2, and at the same time the camera image IMG1 is combined with the camera image IMG3. When the operation content is the "check the traffic situation of the intersection", for example, the camera images IMG1 to IMG3 are combined such that the operator OP can look over the entire intersection.

In the example shown in FIG. 4, two types of the connecting positions CP are set at positions on a far side of the camera image IMG1. Since the imaging range of the camera mounted on the vehicle is known, when the connecting position CP is set at the position on the far side of the camera image IMG1, the camera image IMG1 and the camera image IMG2 are combined in the vertical direction at this set position. The combination of the camera image IMG1 and the camera image IMG3 in the vertical direction is also performed at this set position. In this case, the positional gap PG of the pedestrian crossing occurs at the position on the near side of the camera image IMG1.

When the camera image IMG1 is combined with the camera images IMG2 and IMG3 in the longitudinal direction, a combination in the transverse direction (i.e., vehicle's width direction) is performed in parallel therewith. The combination in the transverse direction always takes place in the same position irrespective of the longitudinal connecting position CP. In other words, the combination in the transverse direction takes place in a fixed position irrespective of the operation content.

As another example, a case is considered in which when a vehicle as the mobile vehicle 1 is scheduled to perform the vehicle control for avoiding the contact with the obstacle, the request signal of the remote operation for confirming a vicinity of the vehicle is transmitted. In this case, the data processing device 12 performs vehicle control for stopping the vehicle before the obstacle and transmits the request signal. When the request signal is transmitted, the data of the operation content is generated. The data of the operation content is expressed by the binary number indicating operation content such as "check surroundings for vehicle control for avoiding a contact with an obstacle ahead" or "perform the vehicle control for avoiding a contact with an obstacle ahead by the remote operation". The binary number indicating the operation content is set in advance.

Figure 5:
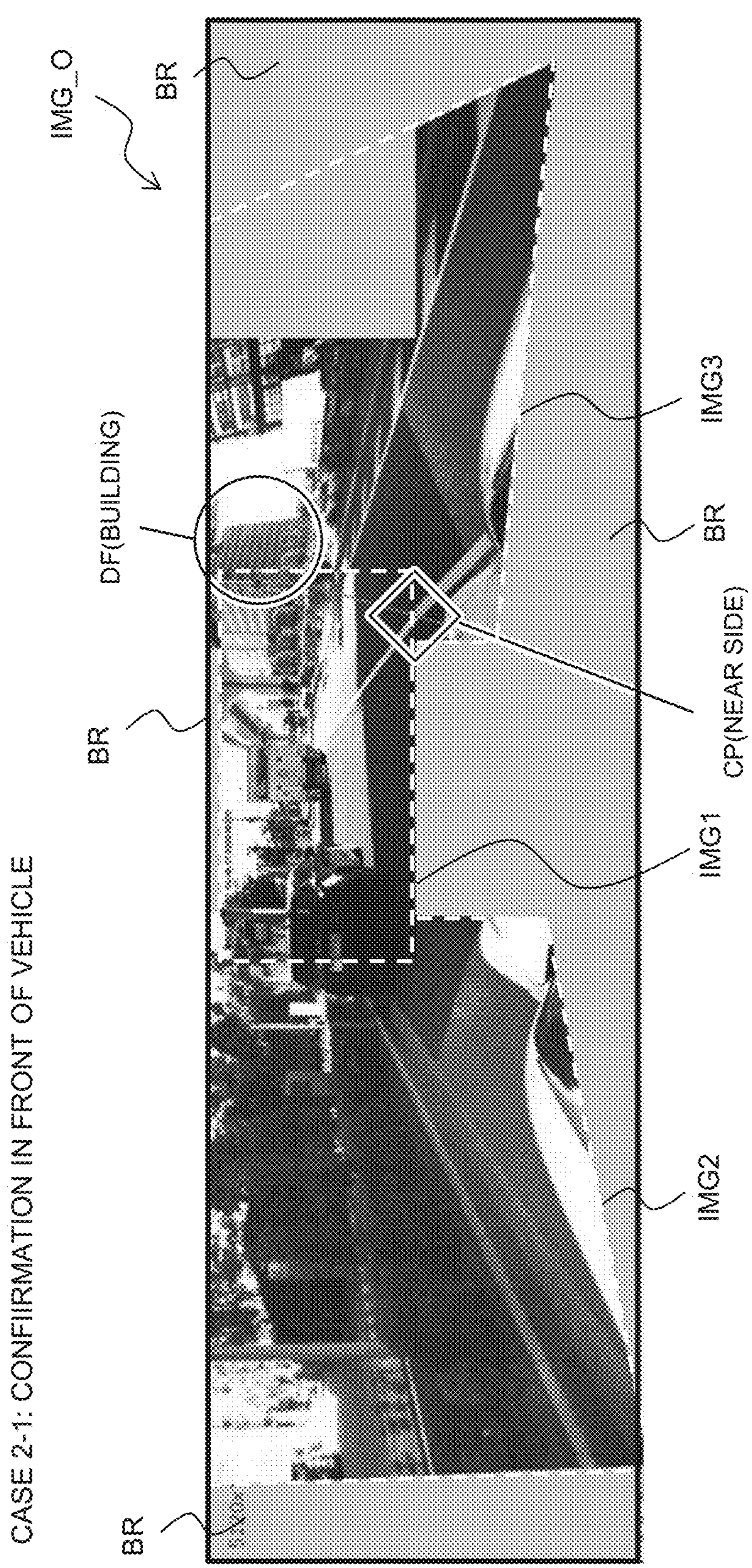
FIG. 5 is a diagram illustrating a synthesis example of the camera image shown in the lower part of FIG. 2.

FIG. 5 shows another synthesis example of the camera images IMG1 to IMG3 shown in the lower part of FIG. 2. As in the example shown in FIG. 4, the display 21 is only one display in the example shown in FIG. 5. Thus, the camera image IMG1 is combined with the camera image IMG2, and at the same time the camera image IMG1 is also combined with the camera image IMG3. For example, when the operation content is "check surroundings for vehicle control for avoiding a contact with an obstacle ahead" or "perform the vehicle control for avoiding a contact with an obstacle ahead by the remote operation", the camera images are combined such that the operator OP can check the approaching situation of the vehicle with respect to the obstacle.

In the example shown in FIG. 5, two types of connecting positions CP are set at positions on the near side of the camera image IMG1. As described above, the imaging range of the camera mounted on the vehicle is known. Therefore, when the connecting position CP is set at a position on the near side of the camera image IMG1, the camera image IMG1 and the camera image IMG2 are combined at this set position. The combination of the camera image IMG1 and the camera image IMG3 is also performed at this set position. In this case, a deformation DF of the building IMG3 occurs at a position on the far side of the camera image.

When the camera image IMG1 is combined with the camera images IMG2 and IMG3 in the vertical direction, the combination in the transverse direction is performed in parallel therewith, which is the same as the example described with reference to FIG. 4.

As described above, in the embodiment, when the two types of the camera image IMGs having partially overlapping imaging ranges are combined to generate the one image for operation IMG_O, the connecting position CP in the vertical direction is set based on the data of the operation content. For this reason, it is possible to generate the image for operation IMG_O in which the visibility of the image at the connecting position CP is ensured while allowing the distortion or the deviation the image at a position other than the connecting position CP. Further, it does not take a long time to generate the image for operation IMG_O. Therefore, the image for operation IMG_O can be quickly provided to the operator OP.

Incidentally, in the examples shown in FIGS. 4 and 5, before the camera images IMG1 to IMG3 are combined, general image processing (e.g., a correction of a distortion caused by an imaging angle, lens characteristics, and the like) is performed on these camera images. Further, when the camera images IMG1 to IMG3 are combined, in addition to the above-described combination, image processing for matching the sizes of objects appearing in these camera images is also performed. Therefore, a blank region BR is formed in the image for operation IMG_O.

In the example shown in FIG. 4, two blank region BRs are formed in the vertical direction of the camera image IMG1. On the other hand, in the example shown in FIG. 5, in addition to the vertical direction of the camera image IMG1, the blank region BRs are also formed leftward of the camera image IMG2 and rightward of the camera image IMG3. In such cases, an additional image (an auxiliary image) may be inserted into the blank region BR.

Figure 6:
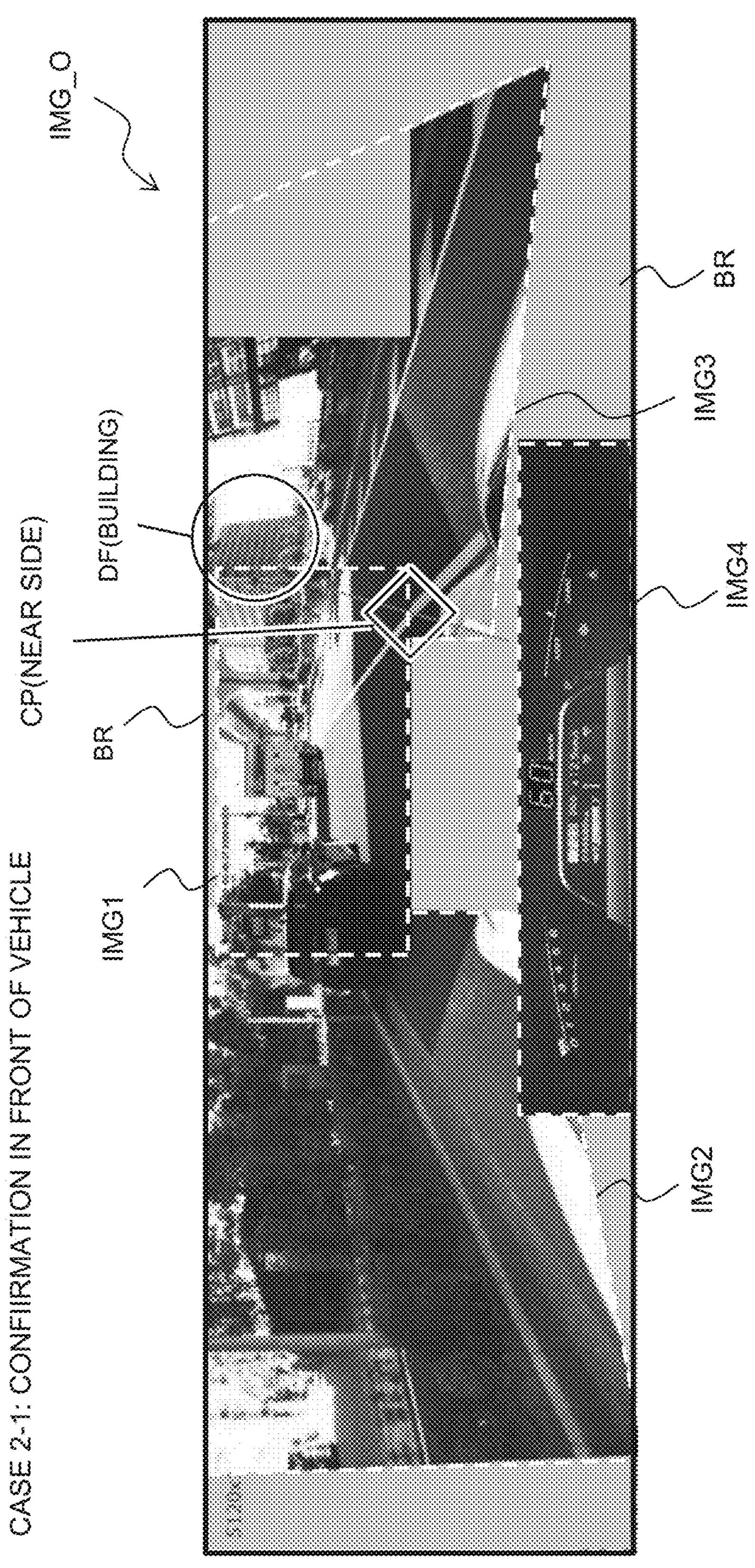
FIG. 6 is a diagram illustrating an example of image for operation in which an additional image is inserted into a blank region.

FIG. 6 is a diagram illustrating an example of the image for operation IMG_O in which the additional image is inserted into the blank region BR. The image for operation IMG_O shown in FIG. 6 is based on that shown in FIG. 5, and an additional image IMG4 is inserted at a position on the front side of the camera image IMG1. The additional image IMG4 is generated based on, for example, an internal status of the mobile vehicle 1 (speed, acceleration, remaining battery level). If the internal status of the mobile vehicle 1 is provided separately from the camera image IMG, the additional image IMG4 can be generated. When such an additional image IMG4 is inserted into the blank region BR, the blank region BR can be effectively utilized.

Hereinafter, the remote operation method and the remote operation device according to the embodiment will be described in detail.

2. Remote Operation System

2-1. Configuration Example of Mobile Vehicle

Figure 7:
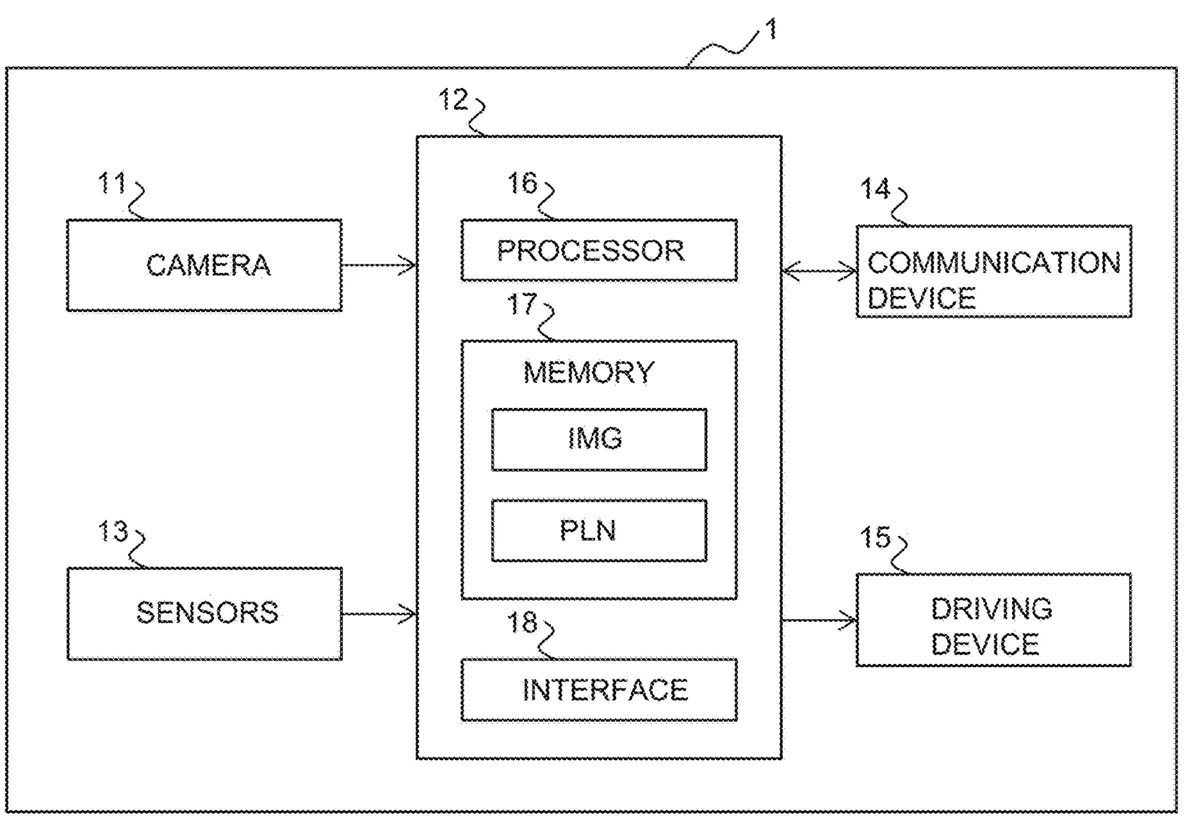
FIG. 7 is a block diagram illustrating a configuration example of the mobile vehicle shown in FIG. 1.

FIG. 7 is a block diagram illustrating a configuration example of the mobile vehicle 1 shown in FIG. 1. As shown in FIG. 7, the mobile vehicle 1 includes the camera 11, the data processing device 12, sensors 13, a communication device 14, and a driving device 15. The camera 11, the sensors 13, the communication device 14, and the driving device 15 are connected to the data processing device 12 by, for example, an in-vehicle network (e.g., a controller area network (CAN)).

The camera 11 captures at least a space in front of the mobile vehicle 1 to obtain the camera image IMG. The front photographing camera 11 includes two cameras whose imaging ranges partially overlap each other. The front photographing camera 11 typically includes the front center camera, the left front camera and the right front camera described with reference to FIG. 2. The camera 11 may include a camera (a rightward camera) that captures an image of the rightward direction and the right rear direction of the mobile vehicle 1, a camera (a leftward camera) that captures an image of the leftward direction and the left rear direction of the mobile vehicle 1, and a camera (a rear camera) that captures an image of the rear direction of the mobile vehicle 1. In this case, a part of the imaging range of the rear camera may overlap with the imaging ranges of the rightward camera and the leftward camera. The camera 11 transmits data of the camera image IMG to the data processing device 12.

The data processing device 12 is a computer for processing various data acquired by the mobile vehicle 1. The data processing device 12 includes at least one processor 16, at least one memory 17, and an interface 18. The processor 16 includes a central processing unit (CPU). The memory 17 is a volatile memory such as a DDR memory, and expands a program used by the processor 16 and temporarily stores various data. The various data acquired by the mobile vehicle 1 is stored in the memory 17. The various data includes the data of the camera image IMG described above. The various data includes data of a driving plan PLN of the mobile vehicle 1 and data of a remote command INS. The interface 18 is an interface with external devices such as the camera 11 and the driving device 15.

The sensors 13 include a state sensor that detects the internal status of the mobile vehicle 1. Examples of the state sensor include a speed sensor, an acceleration sensor, a yaw rate sensor, and a steering angle sensor. The sensors 13 also include a position sensor for detecting the position and direction of the mobile vehicle 1. As the position sensor, a global navigation satellite system (GNSS) sensor is exemplified. The sensors 20 may further include recognition sensors other than the camera 11. The recognition sensor recognizes (detects) a surrounding environment of the mobile vehicle 1 using radio waves or light. Examples of the recognition sensor include a millimeter wave radar and a laser imaging detection and ranging (LIDAR). The sensors 13 transmit data of the internal status to the data processing device 12.

The communication device 14 wirelessly communicates with a base station (not illustrated) of the network 4. As a communication standard of the wireless communication, a standard of mobile vehicle communication such as 4G, LTE, or 5G is exemplified. The connection point of the communication device 14 includes the remote operation device 2. In communication with the remote operation device 2, the communication device 14 transmits various data received from the data processing device 12 to the remote operation device 2.

The driving device 15 accelerates, decelerates, and steers the mobile vehicle 1. When the mobile vehicle 1 is a vehicle, the driving device 15 includes, for example, a motor, a steering device, and a brake device. The motor drives the wheels of the vehicle. The steering device steers the wheels. The brake device applies a braking force to the vehicle. Acceleration of the vehicle is performed by controlling the motor. The deceleration of the vehicle is performed by controlling the brake device. Braking of the vehicle may be performed using regenerative braking by control of the motor. Steering of the vehicle is performed by controlling a steering device.

2-2. Driving Plan PLN

Here, the driving plan PLN stored in the memory 17 will be described. In the embodiment, it is assumed that a vehicle as the mobile vehicle 1 performs autonomous driving. The autonomous driving control is performed by the data processing device 12 based on the driving plan PLN. The driving plan PLN is generated based on, for example, a plurality of events sequentially executed in a section in which the autonomous driving is scheduled. The plurality of events include, for example, an acceleration event, a deceleration event, a lane maintenance event, and a lane change event. The acceleration event is an event for accelerating the vehicle. The deceleration event is an event for decelerating the vehicle. The lane keeping event is an event for causing the vehicle to travel such that the vehicle does not depart from the traveling lane. The lane change event is an event for changing the traveling lane.

Figure 8:
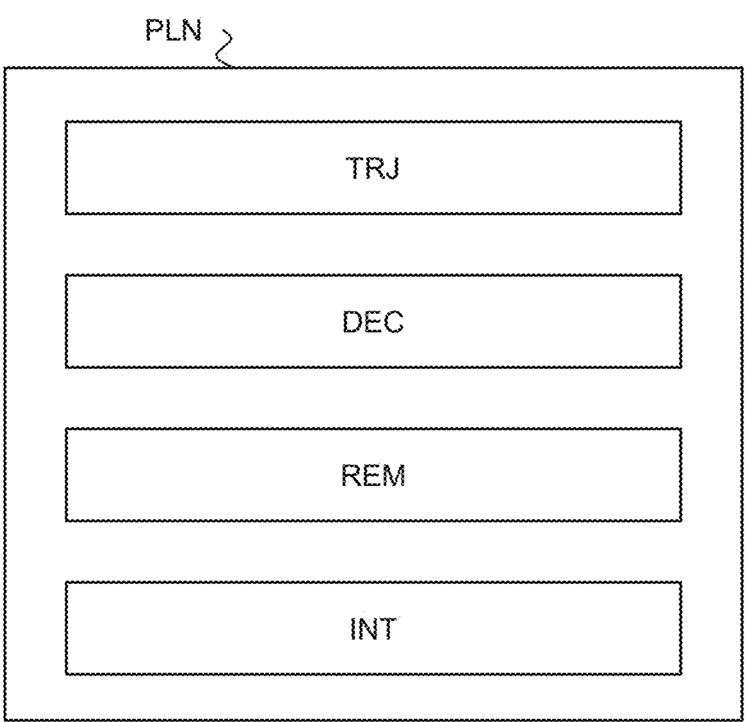
FIG. 8 is a diagram illustrating a configuration example of data of a driving plan.

FIG. 8 is a diagram illustrating a configuration example of the driving plan PLN. In the example shown in FIG. 8, the driving plan PLN includes data of a driving trajectory TRJ of the vehicle, data of a driving decision DEC, data of an operation content in the remote operation REM, and data of an internal status INT of the vehicle.

The driving trajectory TRJ is generated corresponding to each of the plurality of events. The autonomous driving of the vehicle is performed by controlling the driving device 15 such that the vehicle follows the driving trajectory TRJ. The driving decision DEC indicates a decision related to the performance of the vehicle control (i.e., the autonomous driving control) for causing the vehicle to follow the driving trajectory TRJ. The driving trajectory TRJ and the driving decision DEC are appropriately changed based on the driving environment during the autonomous driving control.

As a first example, a case where the autonomous driving control for causing the vehicle to follow the driving trajectory TRJ generated in response to the lane keeping event is performed is considered. As the driving decision DEC in this case, "keeping the traveling lane" is exemplified. If an obstacle is recognized during the lane keeping event that may interfere with the performance of the autonomous driving control, a future behavior of this obstacle is predicted. If the obstacle is a moving object, the trajectory of the obstacle may be predicted based on the future behavior. Once the future behavior is predicted, a new driving decision DEC is generated based on this future behavior. Examples of the new driving decision DEC include a vehicle control for avoiding a contact with an obstacle ahead, a temporary stop before the obstacle, and a request for a remote operation. The driving trajectory TRJ is appropriately changed based on the new driving decision DEC.

As a second example, a case where the autonomous driving control for causing the vehicle to follow the driving trajectory TRJ generated in response to the acceleration event is performed is considered. As the driving decision DEC in this case, "acceleration of the vehicle" is exemplified. If the recognition level of the obstacle recognized during the acceleration event is low, a new driving decision DEC is generated. Examples of the new driving decision DEC include an acceleration stop, a temporary stop before the obstacle, and a request for the remote operation. The temporary stop before the obstacle is the driving decision for increasing the recognition level. Note that the case where the recognition level of the obstacle is low may occur during an event other than the acceleration event. The driving trajectory TRJ is appropriately changed based on the new driving decision DEC.

As a third example, a case where the autonomous driving control for causing the vehicle to follow the driving trajectory TRJ generated in response to a lane change (an interflow) event is performed is considered. As the driving decision DEC in this case, "lane change" is exemplified. A new driving decision is generated if geographical conditions such as entry into a blind intersection, an interflow to a busy highway, or time of day conditions such as dawn or evening are satisfied. In such the cases, a new driving decision DEC is generated from the aspect that ensures traffic safety regardless of whether or not the obstacle is recognized by the vehicle. Examples of the new driving decision DEC include setting of an upper limit speed and a request for the remote operation. The driving trajectory TRJ is appropriately changed based on the new driving decision DEC.

The operation content REM is added to the driving plan PLN when the "request for the remote operation" is generated as the new driving decision DEC. The operation content REM is generated according to the reason why the new driving decision DEC is generated. In the first example described above, the obstacle is recognized. Examples of the operation content REM in this case include the "confirmation of the obstacle", the "confirmation of surroundings of the obstacle", the "permission of an execution of the vehicle control for avoiding a contact with the obstacle", and the "execution of the remote operation (the vehicle control for avoiding a contact with the obstacle ahead by the remote operation)". These operation content REM are set in advance, and at least one of them is selected when adding the operation content REM.

In the second example described above, the recognition level of the obstacle is low. Therefore, as the operation content REM in this case, the "recognition of the obstacle", the "confirmation of the surroundings of the vehicle", and the "execution of the remote operation (manual vehicle control for avoiding a contact with the obstacle)" are exemplified. In the third example described above, the driving decision DEC is generated when the geographical condition or the time zone condition is satisfied. Therefore, as the operation content REM in this case, the "confirmation of the surroundings of the vehicle" and the "execution of the remote operation (the vehicle control for avoiding a contact with the obstacle ahead by the remote operation)" are exemplified. In the second and third examples, likewise in the first example, at least one operation content REM is selected when the operation content REM is added.

The internal status INT is information detected by the status sensor of the vehicle. Examples of the data of the internal status INT include vehicle speed data, acceleration data, and battery remaining amount data. Note that the internal status INT may not be included in the driving plan PLN.

2-3. Function Configuration Example of Data Processing Device 12

Figure 9:
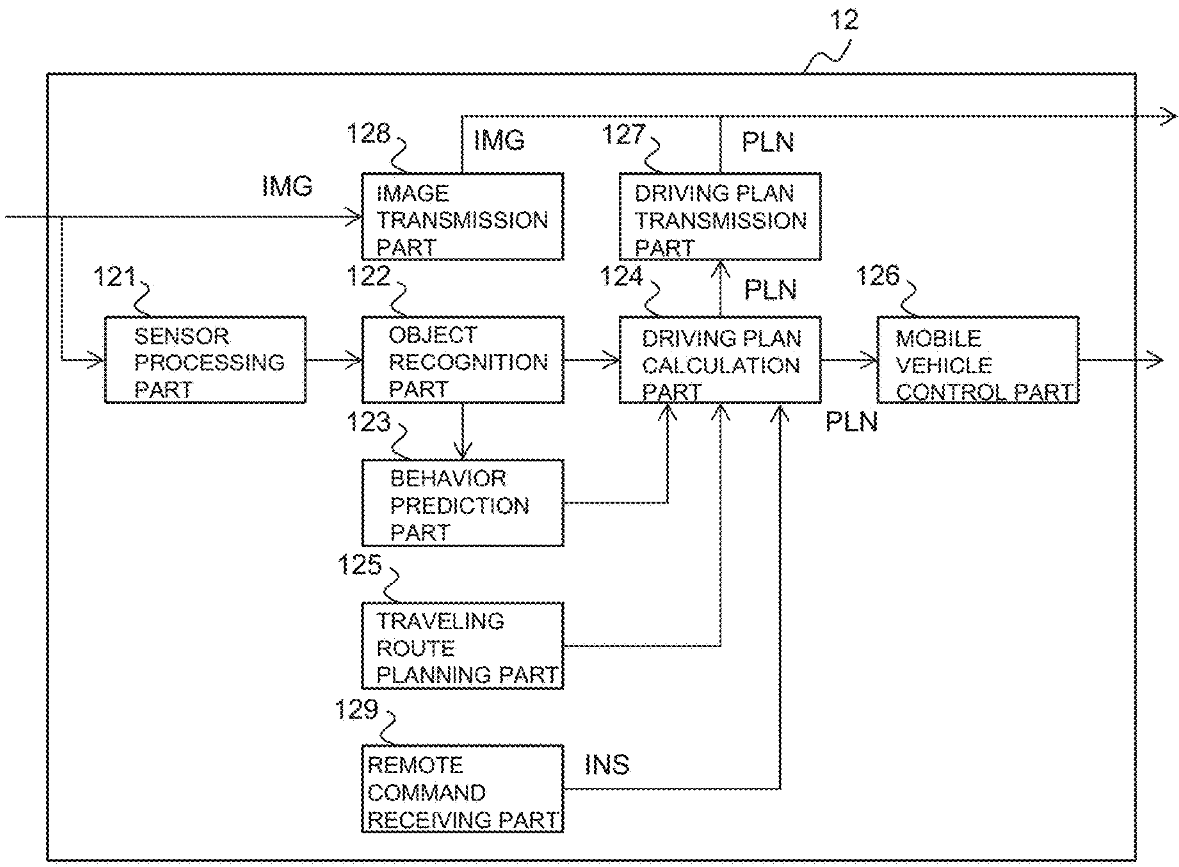
FIG. 9 is a block diagram illustrating a function configuration example of a data processing device of the mobile vehicle shown in FIG. 7.

FIG. 9 is a block diagram illustrating a function configuration example of the data processing device 12 shown in FIG. 7. As shown in FIG. 9, the data processing device 12 includes a sensor processing part 121, an object recognition part 122, a behavior prediction part 123, a driving plan calculation part 124, a traveling route planning part 125, a mobile vehicle control part 126, a driving plan transmission part 127, an image transmission part 128, and a remote command receiving part 129. The functions of these blocks are realized by the processor 16 executing various programs stored in the memory 17.

The sensor processing part 121 processes data acquired by the camera 11 and the sensors 13. The sensor processing part 121 extracts data related to objects around the mobile vehicle 1 by this data process. Examples of the object to be extracted include a static object and a moving object. Examples of the static object include traffic facilities such as a traffic light, a guard rail, a traffic mirror, and a road mark. Examples of the moving object include a walker, a bicycle, a motorcycle, and a vehicle other than the mobile vehicle 1. The extracted data is transmitted to the object recognition part 122.

The object recognition part 122 performs processing to create a fusion of data received from the sensor processing part 121. The object recognition part 122 specifies a specific type of the object around the mobile vehicle 1 by the fusion processing. The object recognition part 122 also calculates relative data (relative position and relative speed) of the specified object with respect to the mobile vehicle 1. For example, by analyzing the camera image IMG, the relative position and relative speed of the specified object are calculated. Further, the relative position and the relative speed of the specified object are calculated by analyzing data from a recognition sensor other than the camera 11. The data of the specified object is transmitted to the behavior prediction part 123 and the driving plan calculation part 124.

The behavior prediction part 123 predicts future behavior of the specified object based on the data received from the object recognition part 122. If the specified object is a dynamic object, a trajectory of the dynamic object may be predicted. The trajectory of the dynamic object is predicted, for example, based on a time series of relative data (relative position and relative speed) of the specified object.

The driving plan calculation part 124 calculates the driving plan PLN. For example, the driving plan calculation part 124 sets various events such as an acceleration event based on a route received from the traveling route planning part 125 (e.g., data of a section scheduled to perform the autonomous driving), and calculates the driving plan PLN. The driving plan calculation part 124 changes the driving plan PLN calculated based on various events based on the information received from the object recognition part 122 (mainly, the information of the static object) and the information received from the behavior prediction part 123 (mainly, the information related to the behavior of the dynamic object). The driving plan PLN is transmitted to the mobile vehicle control part 126 and the driving plan transmission part 127.

In addition, when receiving the remote command INS from the remote command receiving part 129, the driving plan PLN calculation part 124 changes the driving plan based on the remote command INS. As described above, the remote operation includes a remote operation, a remote command, and a remote assistance. If the remote command INS includes a datum for a remote operation, the driving plan PLN calculation part 124 changes the driving plan based on the datum. When the remote command INS includes the datum for remote assistance, the driving plan PLN calculation part 124 resumes the driving plan that has been executed before transmitting the request signal of the remote operation based on the datum. Alternatively, the driving plan PLN calculation part 124 may change the driving plan based on the remote assistance.

The traveling route planning part 125 plans the traveling route of the mobile vehicle 1. The traveling route is planned based on the data of a start position and an end position of the section for which the autonomous driving is scheduled. A planning method of the traveling route is not particularly limited, and a known method is applied.

The mobile vehicle control part 126 controls the driving device 15 such that the mobile vehicle 1 follows the driving trajectory TRJ included in the driving plan PLN received from the driving plan calculation part 124. For example, the mobile vehicle control part 126 calculates a deviation between the driving trajectory TRJ and the mobile vehicle 1. The deviations include a lateral deviation, a yaw angle deviation (a azimuth angle deviation), and a velocity deviation. Then, the mobile vehicle control part 126 calculates an operation amount of the driving device 15 so as to reduce the deviations.

The driving plan transmission part 127 outputs the driving plan PLN received from the driving plan calculation part 124 to the communication device 14. As described above, when the "request for the remote operation" is generated as the new driving decision DEC, the operation content REM is generated according to the reason why the new driving decision DEC is generated. At the timing of the operation content REM is generated or after the operation content REM is generated, the request signal of the remote operation is generated. The operation content REM and the request signal are generated by, for example, the driving plan calculation part 124. The outputting of the driving plan PLN to the communication device 14 is performed simultaneously with or after the outputting of the request signal to the communication device 14.

The image transmission part 128 encodes the data of the camera image IMG and outputs the encoded data to the communication device 14. In the encoding process, the camera image IMG may be compressed. The output of the data of the camera image IMG may be performed along with the output of the request signal of the remote operation to the communication device 14, or may be performed independently of the output of the request signal. That is, the output of the data of the camera image IMG may be performed together with the output of the request signal, or may be performed regardless of the output of the request signal. Furthermore, the transmission of the data of the camera image IMG to the remote operation device 2 may be performed independently of the generation of the request signal.

2-4. Configuration Example of Remote Operation Device

Figure 10:
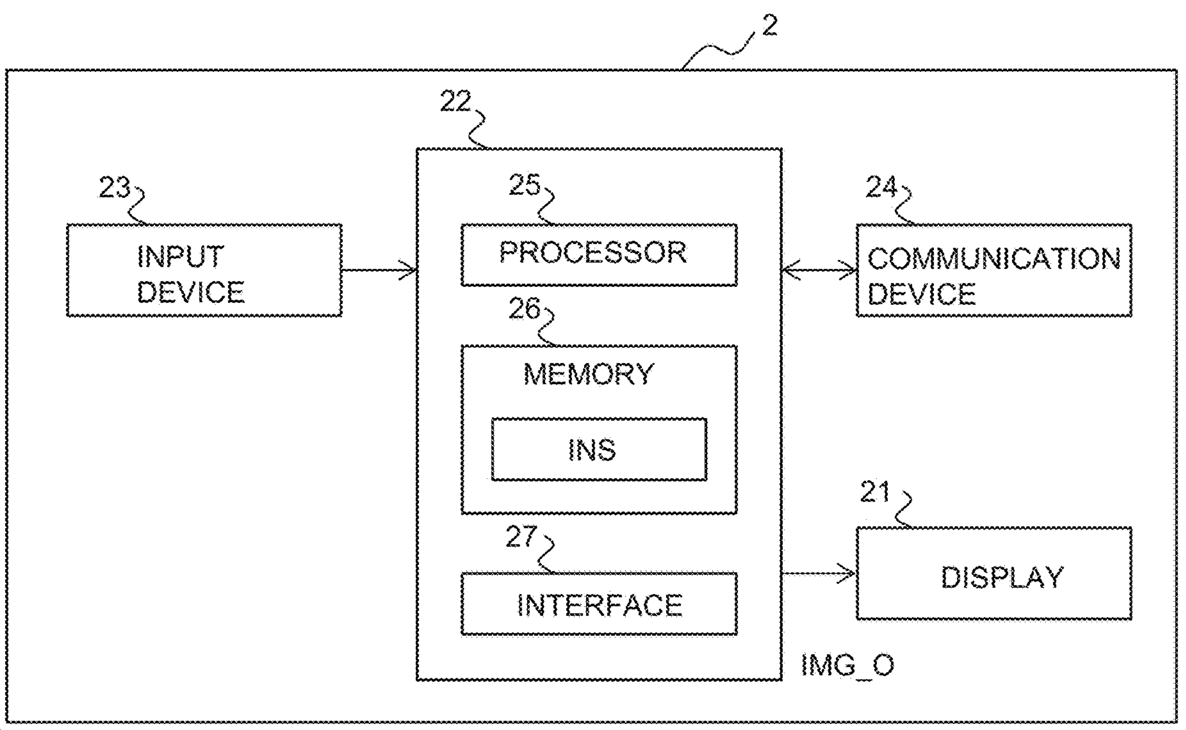
FIG. 10 is a block diagram illustrating a configuration example of the remote operation device illustrated in FIG. 1.

FIG. 10 is a block diagram illustrating a configuration example of the remote operation device 2 shown in FIG. 1. As shown in FIG. 10, the remote operation device 2 includes the display 21, the data processing device 22, an input device 23, and a communication device 24. The data processing device 22 is connected to the display 21, the input device 23, and the communication device 24 via a dedicated network.

The display 21 is a display device to which an image for operation IMG_O is output. The display 21 includes n displays (n□m−1, where m is the total number of the camera 11). The total number of displays 21 is at least one. It is desirable that the total number of the displays 21 is at least two in order to separately output the camera images of the front and rear of the mobile vehicle 1.

The data processing device 22 is a computer for processing various data. The data processing device 22 includes at least one processor 25, at least one memory 26, and an interface 27. The processor 25 includes a CPU. The memory 26 expands a program used by the processor 25 and temporarily stores various data. An input signal from the input device 23 and various data acquired by the remote operation device 2 are stored in the memory 26. The various data includes data of the remote command INS. The various data includes the camera image IMG and the driving plan PLN. The interface 27 is an interface with an external device such as the input device 23.

The processor 25 performs "image processing" to generate the data of the image for operation IMG_O based on the data of the camera image IMG. When the driving plan PLN includes the operation content REM, the processor 25 generates the image for operation IMG_O based on the camera image IMG and the operation content REM. The processor 25 also performs "display control processing" to output data of the generated image for operation IMG_O to the display 21 via the interface 27.

The input device 23 is a device operated by the operator OP. The input device 23 includes, for example, an input unit that receives an input from the operator OP and a control circuit that generates and outputs data of the remote command INS based on the input. Examples of the input unit include a touch panel, a mouse, a keyboard, a button, and a switch. Examples of the input by the operator OP include an operation of moving a cursor output on the display 21 and an operation of selecting a button output on the display 21. The input by the operator OP includes a changing operation of the connecting position CP.

When the remote operation of the mobile vehicle 1 is performed, the input device 23 may include an input device for traveling. Examples of the input device for traveling include a steering wheel, a shift lever, an accelerator pedal, and a brake pedal.

The communication device 24 wirelessly communicates with a base station of the network 4. As a communication standard of the wireless communication, a standard of mobile vehicle communication such as 4G, LTE, or 5G is exemplified. The communication destination of the communication device 24 includes the mobile vehicle 1. In communication with the mobile vehicle 1, the communication device 24 transmits the various data received from the data processing device 22 to the mobile vehicle 1.

2-5. Function Configuration Example of Data Processing Device 22

Figure 11:
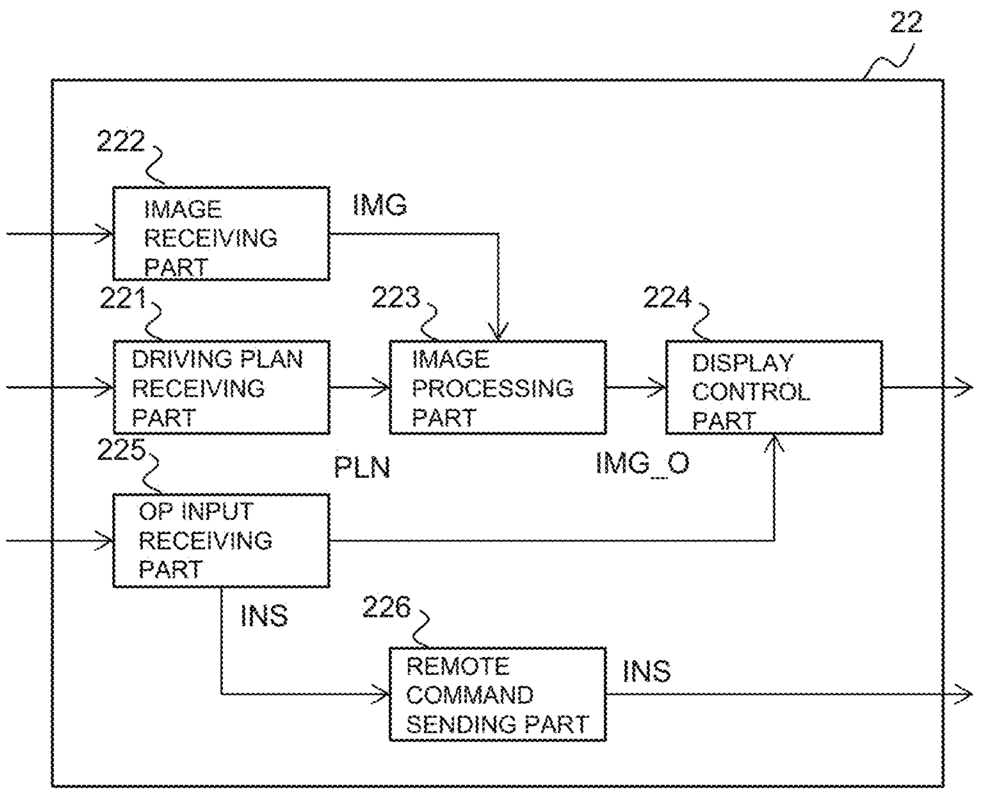
FIG. 11 is a block diagram illustrating a function configuration example of a data processing device of the remote operation device illustrated in FIG. 10.

FIG. 11 is a block diagram illustrating a function configuration example of the data processing device 22 shown in FIG. 10. As shown in FIG. 11, the data processing device 22 includes a driving plan receiving part 221, an image receiving part 222, an image processing part 223, a display control part 224, an OP input receiving part 225, and a remote command sending part 226. The functions of these blocks are realized by the processor 25 executing various programs stored in the memory 26.

The driving plan receiving part 221 receives the data of the driving plan PLN acquired by the communication device 24. The driving plan receiving part 221 transmits the data of the driving plan PLN to the image processing part 223.

The image receiving part 222 decodes the data of the m types of the camera image IMGs acquired by the communication device 24. When the data of the m types of camera images IMG is compressed, the image receiving part 222 expands the data at the time of decoding processing. The image receiving part 222 transmits data of the m types of the camera image IMGs after the decoding processing to the image processing part 223.

The image processing part 223 performs the image processing. In the image processing, data of image for operation IMG_O is generated based on data of the m types of the camera image IMGs received from the image receiving part 222. The total number of generated images for operation IMG_O corresponds to the total number of displays 21. When the data of the operation content REM is received from the driving plan receiving part 221, data of image for operation IMG_O is generated based on this data and the data of the camera image IMG in the image processing.

As described above, the data of the operation content REM is expressed by a binary number indicating the operation content REM. In the embodiment, the correspondence between the binary number indicating operation content REM and the connecting position CP is set in advance. As the connecting position CP, three stages of positions (near side, far side and middle) are prepared. The number of the stages of the connecting position CP is not limited to this example and may be two stages (e.g., the near side and far side) or four or more stages.

Since the imaging range of the camera 11 is known, the two types of the camera image IMGs whose imaging ranges partially overlap each other are easily specified. In the image processing, the connecting position CP is set based on the correspondence relationship between the binary number indicating the operation content REM and the connecting position CP. At this set position, the two types of the camera image IMGs are combined in the vertical direction.

When two types of the camera image IMGs are combined in the vertical direction in image processing, the camera image IMGs are also combined in the transverse direction in parallel. The combination in the transverse direction always takes place in the same position irrespective of the longitudinal connecting position CP. This means that the combination in the transverse direction takes place in a fixed position irrespective of the operation content REM.

When the internal status INT is received from the driving plan receiving part 221, the additional image (the additional image IMG4) may be generated based on the internal status INT in the image processing. In addition, in the image processing, the data of the image for operation IMG_O may be generated based on the data of the additional image and the data of the camera image IMG after the combination processing. The data of the additional image is inserted, for example, at the position of the blank region formed by the combining processing.

The display control part 224 performs display control processing. The display control processing is performed based on the data of the image for operation IMG_O generated by the image processing. The display control part 224 also controls the display content of the display 21 based on the input signal acquired by the OP input receiving portion 225. In the control of the display content based on the input signal, for example, the display content is enlarged or reduced based on the input signal, or the connecting position CP is switched based on the change signal of the connecting position CP. In another example, based on the input signal, a cursor output on the display 21 is moved or a button output on the display 21 is selected.

The OP input receiving unit 225 receives an input signal from the input device 23. If the input signal relates to control of the display content of the display 21, the input signal is transmitted to the display control part 224. The OP input receiving unit 225 also receives data of the remote command INS generated in the input device 23. The data of the remote command INS is transmitted to the remote command transmission unit 226.

The remote command transmission unit 226 transmits the data of the remote command INS received from the OP input reception unit 225 to the communication device 24.

2-6. First Processing Example by Data Processing Device 22

Figure 12:
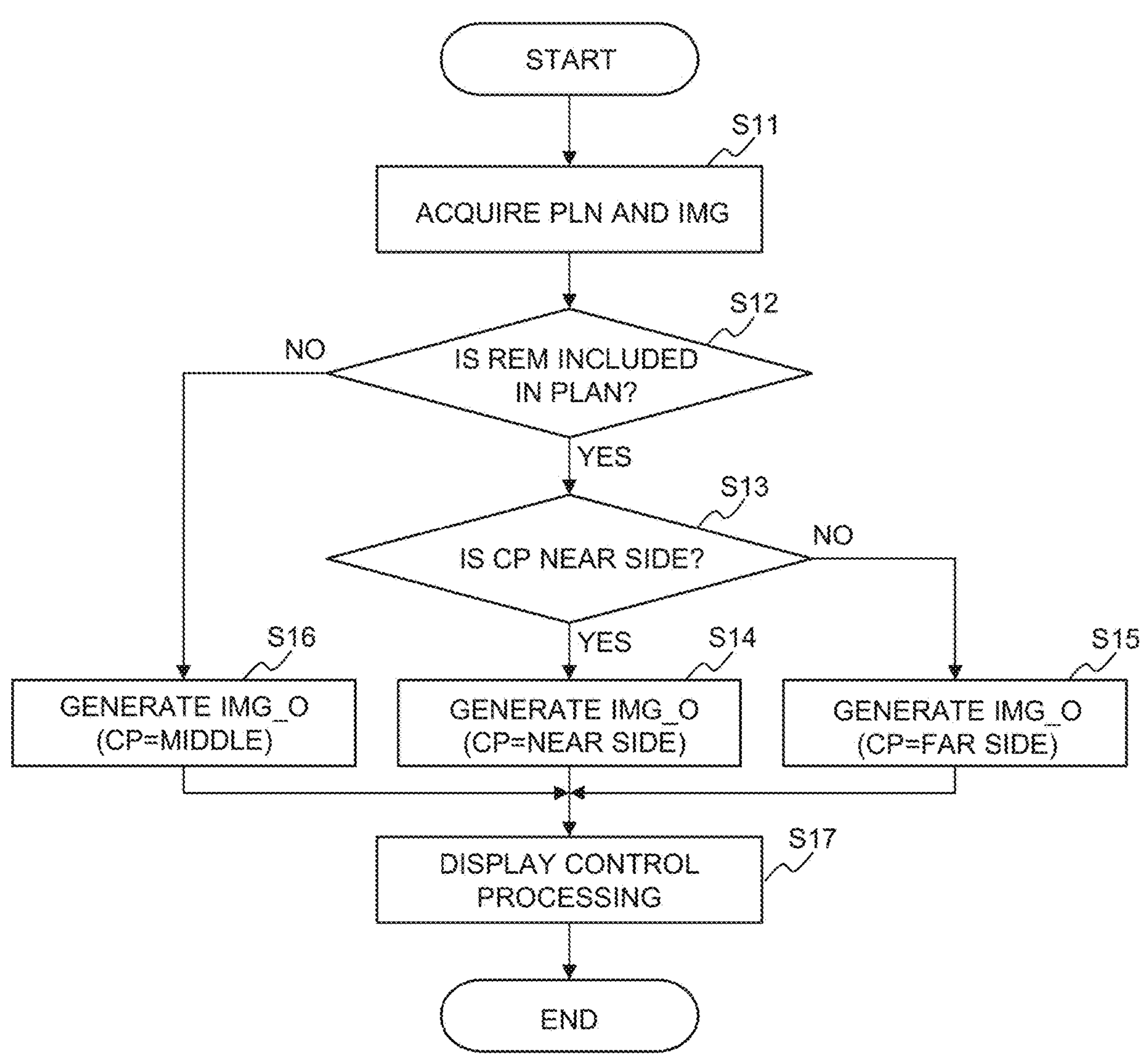
FIG. 12 is a flowchart illustrating an example of processing executed by the data processing device of the remote operation device shown in FIG. 10.

FIG. 12 is a flowchart illustrating an example of processing executed by the data processing device 22 (the processor 25) shown in FIG. 10. The routine shown in FIG. 12 is repeatedly executed at a predetermined control cycle when the processor 25 receives a request signal of a remote operation, for example.

In the routine shown in FIG. 12, first, the driving plan PLN and the camera image IMG are acquired (step S11). The driving plan PLN and the camera image IMG have time stamps. In the processing of step S11, the driving plan PLN and the camera image IMG are associated with each other based on the timestamps.

Following the processing of step S11, it is determined whether the driving plan PLN includes the operation content REM (step S12). As described above, when the "request for remote operation" is generated as a new driving decision DEC, the operation content REM is generated according to the reason why the new driving decision DEC is generated. Therefore, the judgment result of step S12 is usually positive. However, there may be a case where the cause of the driving decision DEC is not specified and the operation content REM is not generated. In such an exceptional case, the process of step S16 is performed.

If the determination result in step S12 is positive, it is determined whether the connecting position CP is on the near side (step S13). As described above, the correspondence between the binary number indicating the operation content REM and the connecting position CP is set in advance. Therefore, in the processing of step S13, determination is made based on this correspondence relationship and the binary number indicating the operation content REM acquired in step S11. When the determination result of step S13 is positive, the process of step S14 is performed. Otherwise, the process of step S15 is performed.

In the processing of step S14, the two types of the camera image IMGs are combined at the set position on the near side, thereby generating the image for operation IMG_O. In the processing of step S15, the two types of the camera image IMGs are combined at the set position on the far side, thereby generating the image for operation IMG_O. In the processing of step S16, the two types of the camera image IMGs are combined at the set position on the middle, thereby generating the image for operation IMG_O.

Following the processing of step S14, S15 or S16, display control processing is performed (step S17). The display control processing is performed based on the image for operation IMG_O generated in step S14, S15, or S16.

2-7. Second Processing Example by Data Processing Device 22

Figure 13:
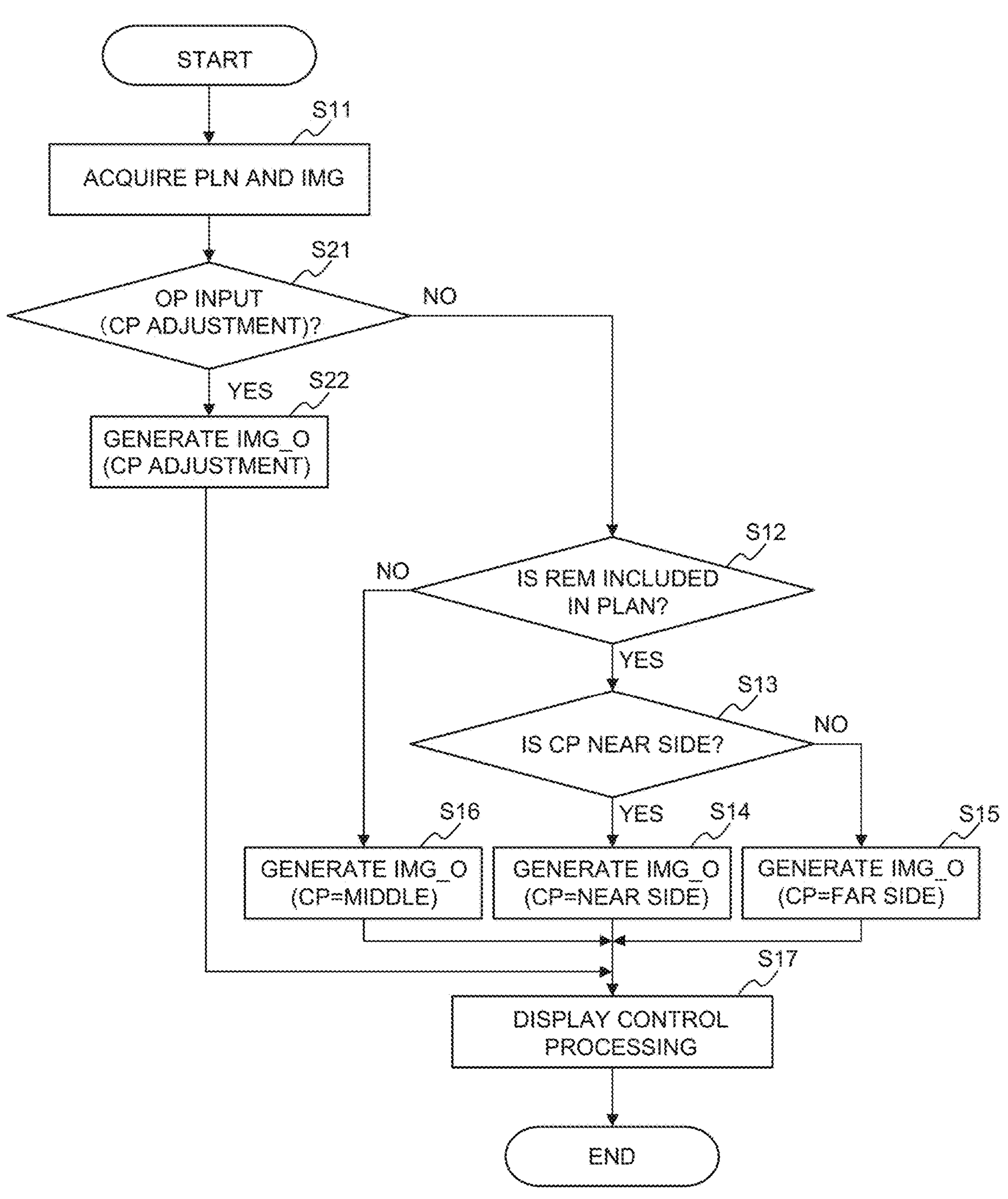
FIG. 13 is a flowchart illustrating another example of processing executed by the data processing device of the remote operation device shown in FIG. 10.

FIG. 13 is a flow chart illustrating another example of processing executed by the data processing device 22 (the processor 25) shown in FIG. 10. The routine shown in FIG. 13 is repeatedly executed at a predetermined control cycle when the processor 25 receives the request signal of the remote operation, similarly to the routine shown in FIG. 12.

In the routine shown in FIG. 13, following the processing of step S11, it is determined whether there is the input signal (the change signal of the connecting position CP) by the operator OP (step S21). When the determination result of step S21 is negative, the processing of step S12 and subsequent steps is performed. The contents of the processing in step S11 and the contents of the processing after step S12 are as described with reference to FIGS. 1 and 2.

If the determination result in step S21 is positive, the connecting position CP is adjusted in accordance with the input signal by the operator OP (step S22). For example, in a case where the image for operation IMG_O in which the two types of the camera images 1 MG are combined at the setting position on the far side is output from the display 21, when there is an input signal requesting switching to the intermediate setting position, the connecting position CP is changed in accordance with this input signal.

3. Effect

According to the embodiment described above, when the two types of the camera image IMGs having partially overlapping imaging ranges are combined to generate one image for operation IMG_O, the connecting position CP in the vertical direction is set based on the data of the operation content REM. For this reason, it is possible to generate the image for operation IMG_O in which the visibility of the image at the connecting position CP is ensured while allowing the distortion or the deviation of the image at a position other than the connecting position CP. Further, it does not take a long time to generate the image for operation IMG_O. Therefore, the image for operation IMG_O can be quickly provided to the operator OP.

Further, according to the embodiment, when there is the input signal (the change signal of the connecting position CP) by the operator OP, the image for operation IMG_O in which the connecting position CP is changed in accordance with the input signal is output from the display 21. Therefore, it is also possible to provide the operator OP with the image for operation IMG_O in which the two types of the camera image IMGs are combined at the position where the operator OP performing the remote operation desires to pay attention.

What is claimed is:

1. A method to perform remote operation of a mobile vehicle, the method comprising the steps of:
- acquiring data of two types of camera images whose imaging ranges partially overlap with each other and data of operation content in the remote operation;
- setting a vertical position at which the two types of camera images are combined based on the operation content data;
- compositing the two types of the camera images by moving at least one of the two types of the camera images in the vertical direction such that the two types of the camera images are combined at the set position in the vertical direction; and
- outputting the composite image of the two types of the camera images on a display of a remote operation device, wherein:
- when the operation content is an indication to check a traffic situation of an intersection, the camera images are combined at a far side of the camera images such that an operator can look over the entire intersection, and
- when the operation content comprises an indication to check surroundings for vehicle control for avoiding a contact with an obstacle ahead or an indication to perform the vehicle control for avoiding a contact with an obstacle ahead by the remote operation, the camera images are combined at a near side of the camera images such that the operator can check an approaching situation of the vehicle with respect to the obstacle.

2. The method according to claim 1, wherein the method further comprising the steps of:
- determining whether an adjustment input of a connecting position of the two types of camera images is received from an input device of the remote operation device while the composite image is output from the display;
- when it is determined that the adjustment input is received, adjusting the connecting position based on the adjustment input; and
- outputting from the display the composite image in which the connecting position is adjusted.

3. The method according to claim 1 wherein the method further comprising the steps of:
- acquiring data of an internal status of the mobile vehicle;
- generating an auxiliary image of the remote operation according to the internal status data;
- adding the auxiliary image to a blank region of the composite image; and
- outputting from the display the composite image to which the auxiliary image is added.

4. The method according to claim 1, wherein lateral positions of the two types of the camera images are constant regardless of the operation content data.

5. A device to perform remote operation of a mobile vehicle, comprising;

a memory device in which various information is stored;

a processor configured to process the various information; and a display from which an image processed by the processor is output, wherein the various information includes data of two types of camera images whose imaging ranges partially overlap each other and data of operation content in the remote operation, wherein the processor is configured to:

setting a position in a vertical direction at which the two types of camera images are combined based on the data of the operation content; and composite the two types of the camera images by moving at least one of the two types of the camera images in the vertical direction such that the two types of the camera images are combined at the set position in the vertical direction; and output from the display the composite image of the two kinds of the camera images, wherein:

when the operation content is an indication to check a traffic situation of an intersection; the camera images are combined at a far side of the camera images such that an operator can look over the entire intersection; and when the operation content comprises an indication to check surroundings for vehicle control for avoiding a contact with an obstacle ahead or an indication to perform the vehicle control for avoiding a contact with an obstacle ahead by the remote operation; the camera images are combined at a near side of the camera images such that the operator can check an approaching situation of the vehicle with respect to the obstacle.

6. The device according to claim 5, further comprising:

an input device operated by an operator who performs the remote operation, wherein the processor is further configured to:

determine whether an adjustment input of a connecting position of the two types of the camera images is received from the input device while the composite image is output from the display;

when it is determined that the adjustment input is received, adjust the connecting position based on the adjustment input; and output from the display the composite image in which the connecting position is adjusted.

7. The device according to claim 5, wherein the various information further includes data of an internal status of the mobile vehicle, wherein the processor is further configured to:

generate an auxiliary image of the remote operation based on the data of the internal status;

adding the auxiliary image to a blank region of the composite image; and output from the display the composite image to which the auxiliary image is added.

8. The device according to claim 5, wherein lateral positions of the two types of the camera images are constant regardless of the operation content data.

9. A method to perform remote operation of a mobile vehicle, the method comprising the steps of:

acquiring data of two types of camera images whose imaging ranges partially overlap with each other and data of operation content in the remote operation, the data of the operation content comprising a binary number indicating the operation content, and a correspondence between the binary number indicating the operation content and a connecting position being set in advance;

setting a connecting position based on the binary number indicating the operation content and the correspondence between the binary number indicating the operation content and the connecting position;

setting a vertical position at which the two types of camera images are combined based on the connecting position;

compositing the two types of the camera images by moving at least one of the two types of the camera images in the vertical direction such that the two types of the camera images are combined at the set position in the vertical direction; and outputting the composite image of the two types of the camera images on a display of a remote operation device, wherein:

when the operation content is an indication to check a traffic situation of an intersection, the camera images are combined at a far side of the camera images such that an operator can look over the entire intersection, and when the operation content comprises an indication to check surroundings for vehicle control for avoiding a contact with an obstacle ahead or an indication to perform the vehicle control for avoiding a contact with an obstacle ahead by the remote operation, the camera images are combined at a near side of the camera images such that the operator can check an approaching situation of the vehicle with respect to the obstacle.

10. The method according to claim 9, wherein the method further comprising the steps of:

determining whether an adjustment input of a connecting position of the two types of camera images is received from an input device of the remote operation device while the composite image is output from the display;

when it is determined that the adjustment input is received, adjusting the connecting position based on the adjustment input, and outputting from the display the composite image in which the connecting position is adjusted.

11. The method according to claim 9, wherein the method further comprising the steps of:

acquiring data of an internal status of the mobile vehicle;

generating an auxiliary image of the remote operation according to the internal status data; adding the auxiliary image to a blank region of the composite image; and outputting from the display the composite image to which the auxiliary image is added.

12. The method according to claim 9, wherein lateral positions of the two types of the camera images are constant regardless of the operation content data.

* * * * *